(12) United States Patent
Pepe et al.

(10) Patent No.: US 10,639,976 B2
(45) Date of Patent: May 5, 2020

(54) RETRACTABLE VEHICLE INTERIOR PROTECTION APPARATUS

(71) Applicants: Douglas J. Pepe, Atlantic Highlands, NJ (US); Michael A. Abboud, Oceanport, NJ (US)

(72) Inventors: Douglas J. Pepe, Atlantic Highlands, NJ (US); Michael A. Abboud, Oceanport, NJ (US)

( * ) Notice: Subject to any disclaimer, the term of this patent is extended or adjusted under 35 U.S.C. 154(b) by 117 days.

(21) Appl. No.: 16/152,239

(22) Filed: Oct. 4, 2018

(65) Prior Publication Data

US 2020/0108701 A1    Apr. 9, 2020

(51) Int. Cl.
*B60J 7/08* (2006.01)
*B60R 13/02* (2006.01)

(52) U.S. Cl.
CPC ........... *B60J 7/085* (2013.01); *B60R 13/0256* (2013.01)

(58) Field of Classification Search
CPC .............................. B60J 7/085; B60R 13/0256
USPC .......................................................... 296/98
See application file for complete search history.

(56) References Cited

U.S. PATENT DOCUMENTS

| | | | |
|---|---|---|---|
| 3,050,075 A | 8/1962 | Kaplan et al. | |
| 4,691,957 A | 9/1987 | Ellingson | |
| 4,828,319 A * | 5/1989 | Benson | B60J 11/02 |
| | | | 160/23.1 |
| 4,872,722 A | 10/1989 | Farmont | |
| 5,114,204 A * | 5/1992 | Bernardo | B60N 2/6009 |
| | | | 150/154 |
| 5,201,565 A * | 4/1993 | Berardino | B60J 7/104 |
| | | | 160/354 |
| 5,275,460 A | 1/1994 | Kraus | |
| 5,409,286 A | 4/1995 | Huang | |
| 5,597,196 A | 1/1997 | Gibbs | |
| 5,655,807 A | 8/1997 | Rosario | |
| 5,655,810 A * | 8/1997 | Shikler | B60J 11/00 |
| | | | 150/154 |
| 5,711,568 A | 1/1998 | Diem et al. | |

(Continued)

FOREIGN PATENT DOCUMENTS

CN        201291747 Y        8/2009

OTHER PUBLICATIONS

Alien Sunshade Jeep Wrangler Mesh Top Cover with 10 Year Warranty Provides UV Protection for Your 4-Door JKU (2007-2017) Original Black. Alien Sunshade. Accessed online Nov. 4, 2018 at https://www.amazon.com/Alien-Sunshade-Wrangler-Protection-2007-2017/dp/B00JVWDWPS.

(Continued)

*Primary Examiner* — Pinel E Romain
(74) *Attorney, Agent, or Firm* — Gregory Finch; Finch Paolino, LLC

(57) ABSTRACT

An apparatus comprising a retractable shade constructed of waterproof material that may be spring-loaded and stored inside a housing. The housing may comprise straps or other coupling means to selectively couple the apparatus to a roll bar of an open-top vehicle. For example, the housing may attach via hook-and-loop straps to a center bar of an open-top vehicle, for example a Jeep®. An exterior of the apparatus may incorporate hooks and a pull handle. The hooks may connect into one or more connectors on an upper portion of the open-top vehicle. The pull handle may be utilized to pull the shade from the housing, and engage the hooks to the one or more connectors.

20 Claims, 10 Drawing Sheets

(56) References Cited

U.S. PATENT DOCUMENTS

| | | | |
|---|---|---|---|
| 6,012,759 A | 1/2000 | Adamek | |
| 6,015,184 A * | 1/2000 | Ewing | B60J 7/0015 |
| | | | 160/270 |
| 6,044,856 A | 4/2000 | Cano | |
| 6,158,805 A * | 12/2000 | Blaney | B60N 2/24 |
| | | | 135/88.09 |
| 6,206,454 B1 | 3/2001 | Cory | |
| 6,513,858 B1 | 2/2003 | Li et al. | |
| 6,655,736 B1 | 12/2003 | Arenas | |
| 6,682,123 B2 | 1/2004 | Burks et al. | |
| 7,278,677 B2 | 10/2007 | Emerson | |
| 7,337,793 B2 | 3/2008 | Chen | |
| 7,594,695 B2 | 9/2009 | Noonan | |
| 7,604,281 B1 | 10/2009 | Raynor | |
| 8,231,165 B2 | 7/2012 | Demma | |
| 8,276,607 B2 | 10/2012 | Kim | |
| 9,925,855 B2 * | 3/2018 | Joao | B60J 11/08 |
| 9,975,491 B2 | 5/2018 | Morlet Ugalde et al. | |
| 10,005,345 B2 * | 6/2018 | Murray | B60J 7/10 |
| 2004/0238089 A1 | 12/2004 | Li et al. | |
| 2006/0131551 A1 | 6/2006 | Hopp et al. | |
| 2006/0232095 A1 | 10/2006 | Sedighzadeh | |
| 2007/0177265 A1 * | 8/2007 | Focardi | B60J 11/02 |
| | | | 359/509 |
| 2012/0037321 A1 * | 2/2012 | Pham | E06B 9/44 |
| | | | 160/121.1 |
| 2017/0355250 A1 | 12/2017 | Hammerle | |
| 2018/0099545 A1 | 4/2018 | Prokhorov | |
| 2018/0273116 A1 * | 9/2018 | Collyer | B62D 27/06 |

OTHER PUBLICATIONS

Black Sunshade Mesh Top Cover Provides UV Protection for Jeep Wrangler 4-Door JK or JKU (2007-2017). Skyhmoto. Accessed online Nov. 9, 2018 at https://www.amazon.com/Sunshade-Provides-Protection-Wrangler-2007-2017/dp/B01KFP4CJE.

* cited by examiner

RETRACTABLE VEHICLE INTERIOR PROTECTION APPARATUS

FIELD

The present disclosure relates to the field of automotive accessories; in particular, a retractable vehicle interior protection apparatus.

BACKGROUND

Open-top and convertible vehicles feature interior components that may be damaged or destroyed by continued exposure to the elements. Intense sun, wind and precipitation as well as falling objects including debris from vegetation and bird excrement may cause expensive damage or mere annoyance to unprotected vehicle interiors. For owners of such vehicles, for example open-top vehicles of the JEEP brand securing the top cover of the vehicle each time the driver wishes to park can be time consuming and impractical.

Through applied effort, ingenuity, and innovation Applicant has identified a number of deficiencies and problems with protective accessories for open-top and convertible vehicles. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

A retractable shade is provided to protect interior components of a vehicle from the elements. The shade may be stored inside a tube that is affixed to a portion of the vehicle. When the vehicle is parked, the operator may not wish to affix the top cover onto the vehicle body, which may be a time-consuming process. The present disclosure instead provides the lightweight retractable shade which may be pulled from the tube into opened and fastened position. The shade may be easily retracted back into the tube when the vehicle operator intends to use the vehicle again. In embodiments the shade may attach to the vehicle dashboard and pull down and cover the dashboard and console area of the vehicle, thus protecting these areas from sun and other elements.

An object of the present disclosure is an automotive interior protection apparatus comprising a roller portion being substantially cylindrical in shape and comprising a spring mechanism configured to rotate the roller portion from a first position to a second position; a shade portion being substantially rectangular in shape and coupled to the roller portion at a first end, the shade portion being selectively rolled around a circumference of the roller portion, the shade portion being made of a water resistant fabric; a bar portion coupled to a second end of the shade portion, the bar portion being substantially rigid; at least one windshield connector coupled to a surface of the bar portion; and, at least one roll bar connector selectively coupled to the roller portion, the at least one roll bar connector being configured to selectively secure the roller portion to a roll bar of an open-top automobile.

Another object of the present disclosure is an automotive interior protection apparatus a comprising a roller portion being substantially cylindrical in shape and comprising a spring mechanism configured to rotate the roller portion from a first position to a second position; a shade portion being substantially rectangular in shape and coupled to the roller portion at a first end, the shade portion being selectively rolled around a circumference of the roller portion, the shade portion being made of a water resistant fabric; a bar portion coupled to a second end of the shade portion, the bar portion being substantially rigid; at least one windshield connector coupled to a surface of the bar portion; and, a housing having an exterior portion and an interior portion, the roller portion being secured within the interior portion of the housing, the shade portion extending from the interior portion of the housing at the first end of the shade portion to the exterior portion of the housing at the second end of the shade portion, the housing being configured to be selectively coupled to a roll bar of an open-top automobile.

Yet another object of the present disclosure is an automotive interior protection apparatus comprising a dashboard protection portion being constructed of a water resistant fabric, the dashboard protection portion having a first end and a second end and at least one pleat extending from the first end to the second end; and, a weighted portion coupled to the first end of the dashboard protection portion, the weighted portion being comprised of at least two segments, the at least two segments being foldable at a midpoint, the midpoint being aligned with the at least one pleat of the dashboard protection portion.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1A:
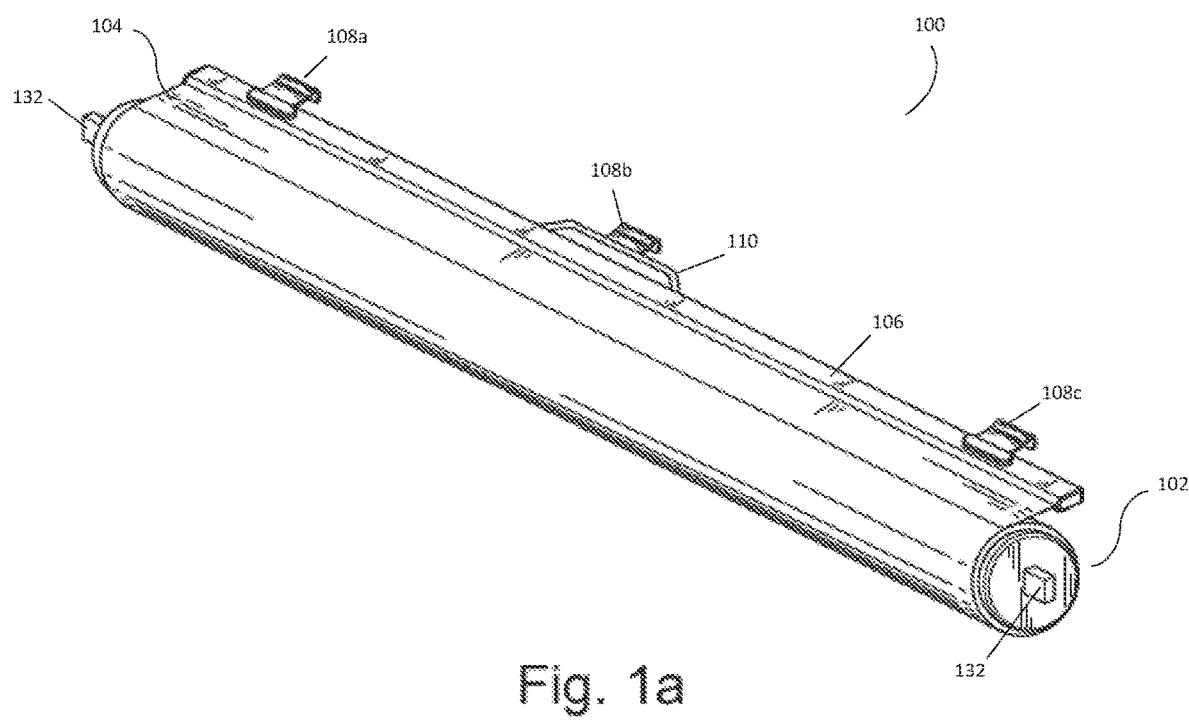
FIG. 1a is a perspective view of a retractable vehicle interior protection apparatus, according to an embodiment of the present disclosure.

Exemplary embodiments are described herein to provide a detailed description of the present disclosure. Variations of these embodiments will be apparent to those of skill in the art. Moreover certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import.

Embodiments of the present disclosure provide for an apparatus comprising a retractable shade constructed of waterproof material that may be spring-loaded and stored inside a housing. The housing may comprise straps or other coupling means to selectively couple the apparatus to a roll bar of an open-top vehicle. For example, the housing may attach via hook-and-loop straps to a center bar of an open-top vehicle, for example a Jeep®. An exterior of the apparatus may incorporate hooks and a pull handle. The hooks may connect into one or more connectors on an upper portion of the open-top vehicle. The pull handle may used to pull the shade from the housing, and engage the hooks to the one or more connectors.

During periods of warm weather, the apparatus may remain connected to the vehicle and the shade kept in a retracted state when the vehicle is being driven. When the vehicle is parked, the shade may be pulled into an extended position by a user and coupled to an upper, forward portion of the vehicle; for example, the upper frame of the windshield. In an extended position, the apparatus provides protection from sun and precipitation from the interior and dashboard of the vehicle. The apparatus may be of value to owners of open-top vehicles, such as Jeeps", as a means of quickly and easily protecting their vehicle's dash and interior when the vehicle is parked and in an open-top configuration.

Figure 3:
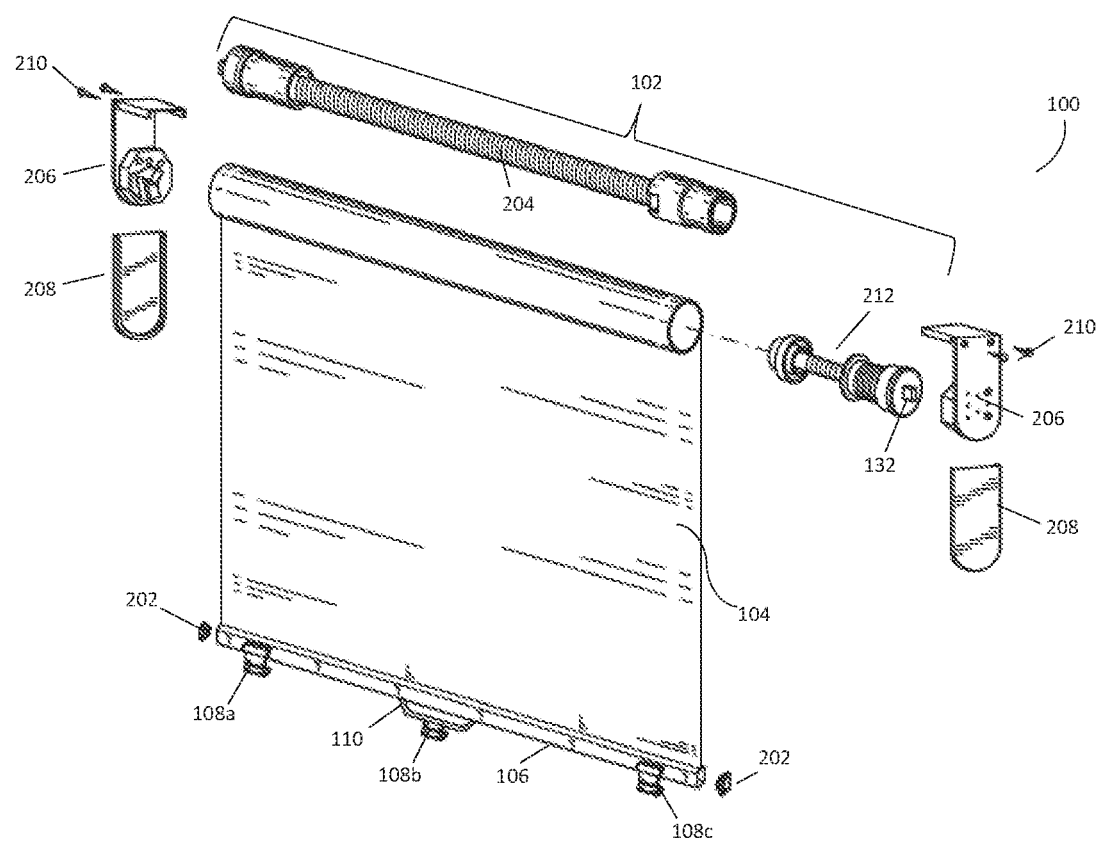
FIG. 3 is an exploded view of a retractable vehicle interior protection apparatus according to an embodiment of the present disclosure.
Figure 4A:
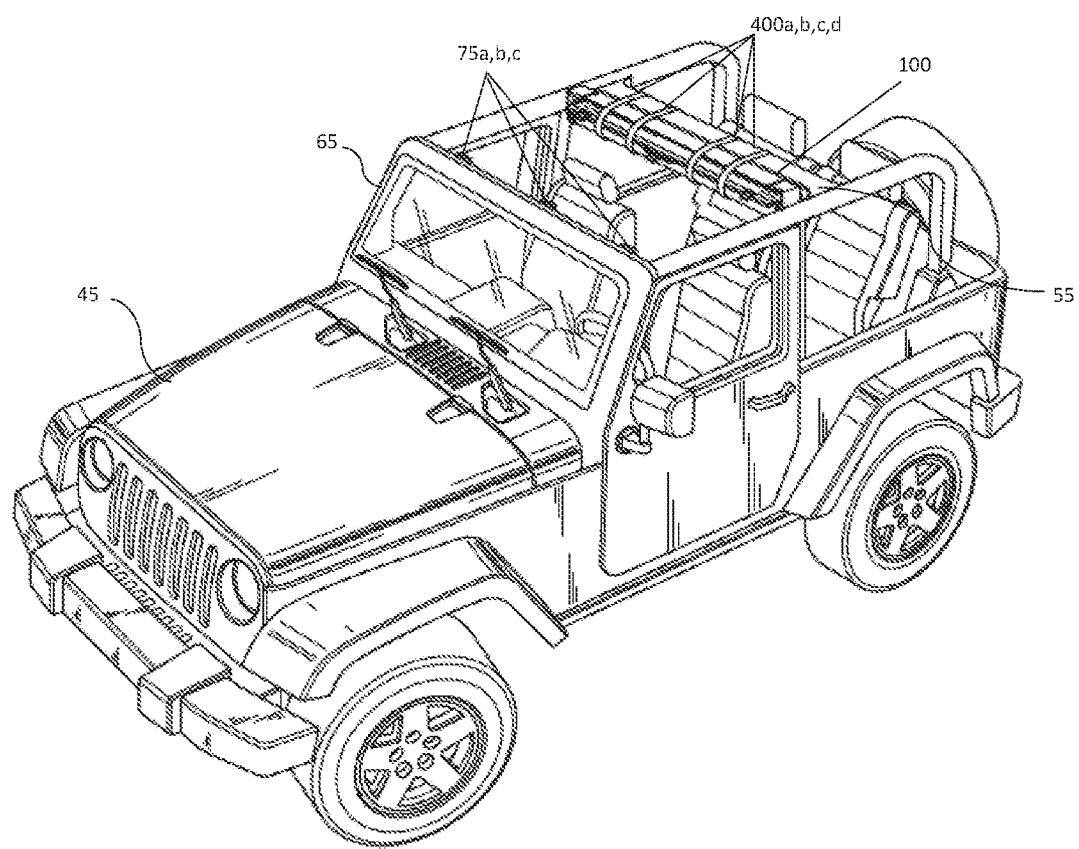
FIG. 4a is a perspective view of a retractable vehicle interior protection apparatus coupled to a roll bar of an open-top vehicle, according to an embodiment of the present disclosure.

FIG. 1a is a perspective view of a retractable vehicle interior protection apparatus 100. According to an embodiment of the present disclosure, apparatus 100 is generally comprised of a roller portion 102, a shade portion 104, a bar portion 106, windshield connector portions 108a, 108b, and 108c, and a handle 110. Roller portion 102 is substantially cylindrical in shape, and may have a connector portion 132 at a first end and a second end. Roller portion 102 may include a spring mechanism (as shown in FIG. 3) that enables a user to selectively roll and unroll shade portion 104 around a circumference of roller portion 102. According to an embodiment, shade portion 104 is constructed of a water resistant fabric. Shade portion 104 may be coupled to a length of roller portion 102 at a first end and may be coupled to bar portion 106 at a second end. The area of water resistant fabric extending from the first end of shade portion 104 to the second end of shade portion 104 may be selectively wound around the circumference of roller portion 102 via the spring mechanism of roller portion 102. Bar portion 106 is coupled to the second end of shade portion 104 to prevent the second end of shade portion 104 from being fully wound around the circumference of roller portion 102. Bar portion 106 may be substantially rigid in its construction, and may be made or metal, plastic, wood, or the like. Windshield connector portions 108a, 108b, and 108c may be coupled to a surface of bar portion 106. According to an embodiment, windshield connector portions 108a, 108b, and 108c may be configured as substantially i-shaped hooks, and may be configured to selectively couple to an attachment portion of a windshield frame (as shown in FIG. 4a). A handle 110 may be coupled to a surface of bar portion 106.

Figure 1B:
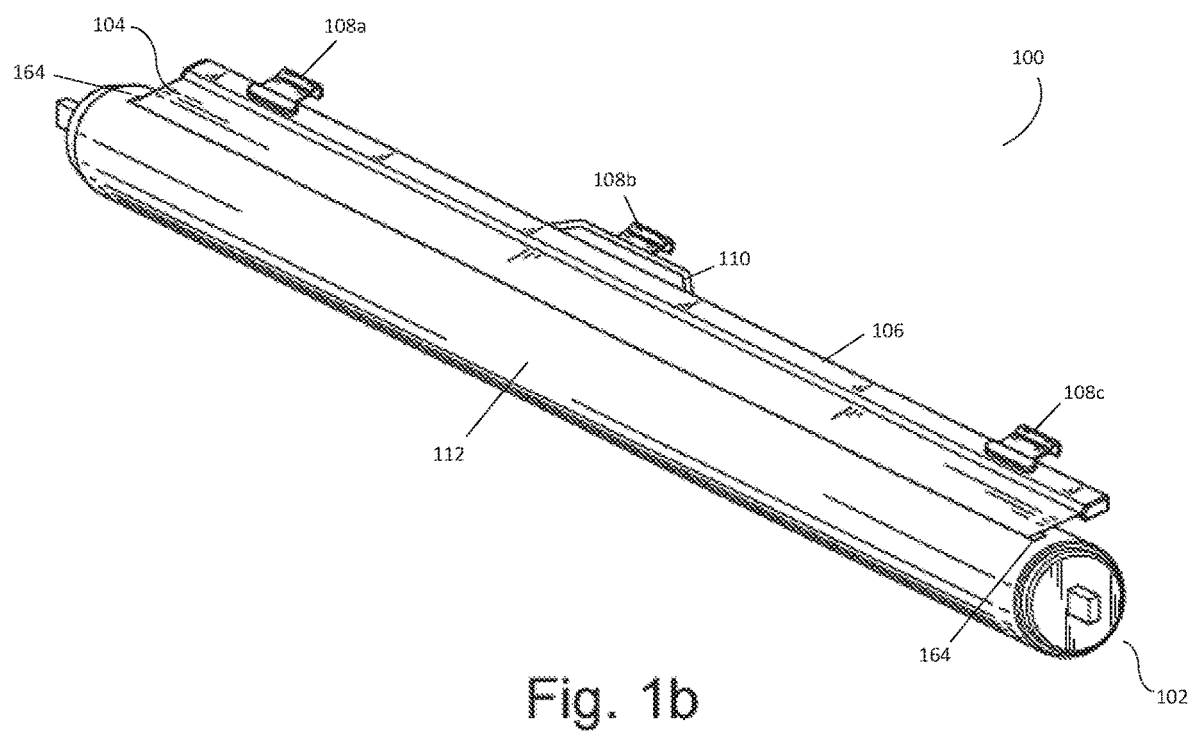
FIG. 1b is a perspective view of a retractable vehicle interior protection apparatus incorporating a plastic housing, according to an embodiment of the present disclosure.

Referring now to FIG. 1b, a perspective view of a retractable vehicle interior protection apparatus 100 incorporating a housing 112 is shown. According to an embodiment of the present disclosure, apparatus 100 as shown and described in FIG. 1a may be housed within an interior portion of housing 112 such that the second end of shade portion 104 extends from an opening 164 of housing 112. Bar portion 106 is configured to prevent the second end of shade portion 104 from retracting into the interior portion of housing 112.

Figure 2:
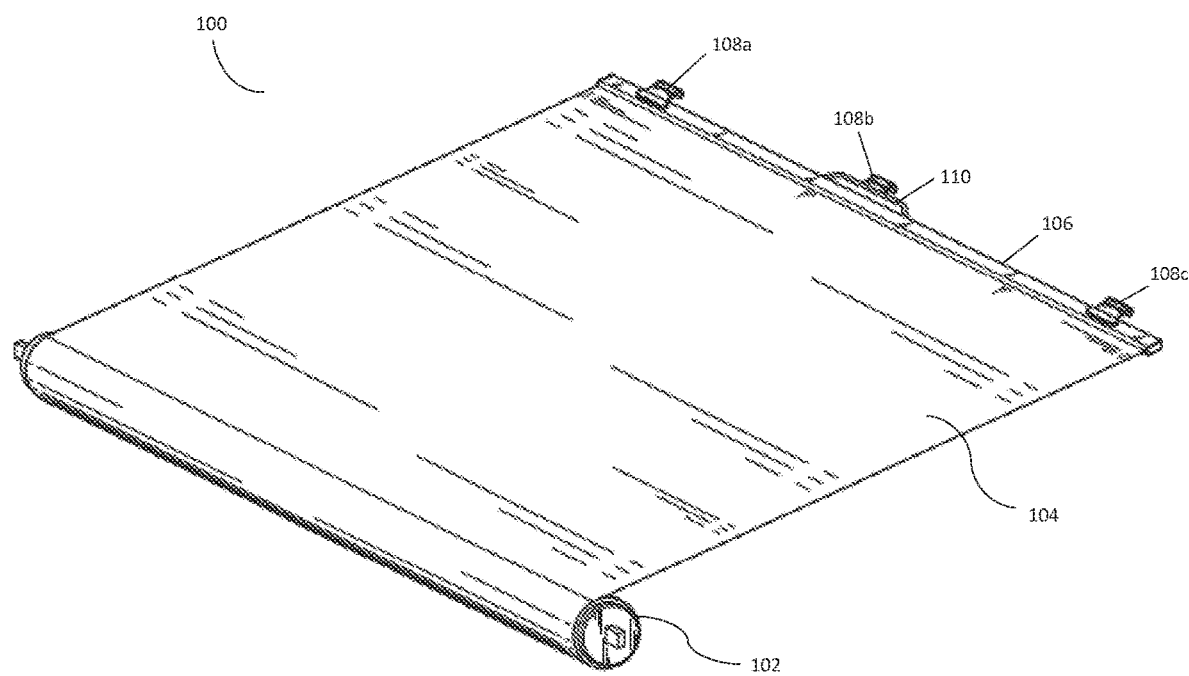
FIG. 2 is a perspective view of a retractable vehicle interior protection apparatus in an extended position, according to an embodiment of the present disclosure.

FIG. 2 is a perspective view of a retractable vehicle interior protection apparatus 100 in an extended position. According to an embodiment of the present disclosure, a user may selectively unroll shade portion 104 around the circumference of roller portion 102 by pulling on handle 110 or bar portion 106. The spring mechanism (as shown in FIG. 3) of roller portion 102 is configured to enable the user to roll and unroll shade portion 104 from a rolled position to an extended position.

FIG. 3 is an exploded view of a retractable vehicle interior protection apparatus 100. According to an embodiment of the present disclosure, roller portion 102 is comprised of a roller 204 and a spring mechanism 212. Spring mechanism 212 is operably engaged with roller 204 to selectively roll and unroll shade portion 104 from a rolled position to an extended position. Apparatus 100 may include a bracket portion 206, a bracket cover 208, and bracket screws 210. Bracket portion 206 may include an attachment portion to interface with connector portion 132. According to an embodiment, bar portion 106 may further comprise end caps 202 coupled to terminal ends of bar portion 106.

FIG. 4a is a perspective view of a retractable vehicle interior protection apparatus 100 coupled to a roll bar 55 of an open-top vehicle 45. According to an embodiment of the present disclosure, one or more roll bar connectors 400a,b,c,d selectively couple apparatus 100 to roll bar 55. Roll bar connectors 400a,b,c,d may be comprised of hook and loop fasteners to selectively couple apparatus 100 to roll bar 55. Open-top vehicle 45 may be configured to have a windshield 65 with windshield connections 75a,b,c.

Figure 4B:
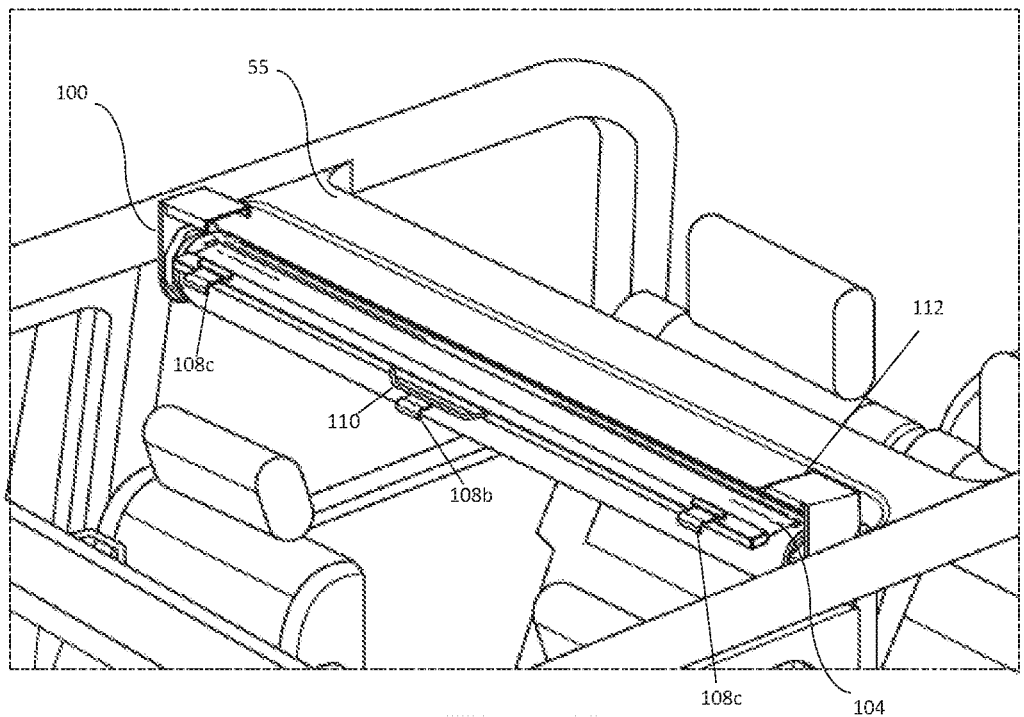
FIG. 4b is a perspective view of a retractable vehicle interior protection apparatus incorporating a plastic housing coupled to a roll bar of an open-top vehicle, according to an embodiment of the present disclosure.

FIG. 4b is a perspective view of a retractable vehicle interior protection apparatus 100 coupled to roll bar 55 by coupling housing 112 to a portion of roll bar 55.

Figure 5:
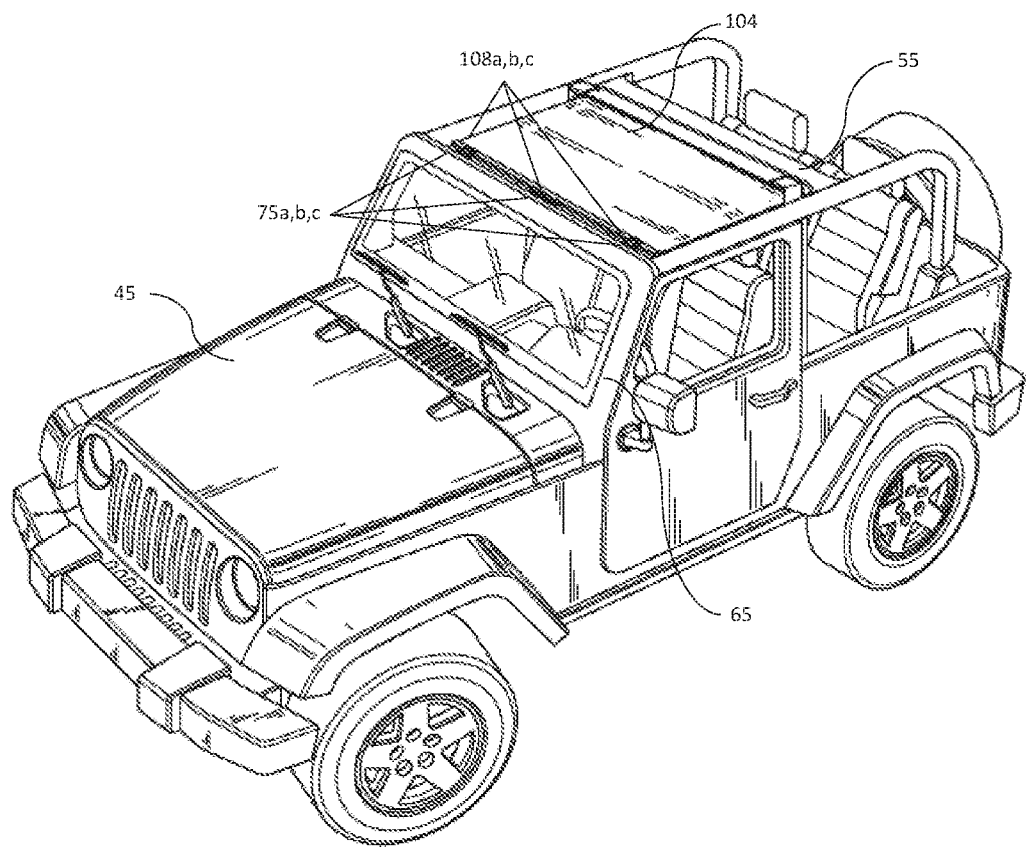
FIG. 5 is a perspective view of a retractable vehicle interior protection apparatus coupled to a roll bar of an open-top vehicle, according to an embodiment of the present disclosure.

FIG. 5 is a perspective view of a retractable vehicle interior protection apparatus 100 coupled to roll bar 55 of open-top vehicle 45, with shade portion 104 in an extended position. When the driver of open-top vehicle 45 places the vehicle in park, the driver may configure apparatus 100 from a rolled or retracted configuration to an extended or unrolled configuration by pulling handle 110 (as shown in FIG. 2). The second end of shade portion 104 is selectively coupled to windshield 65 by engaging windshield connector portions 108a,b,c with windshield connections 75a,b,c. To configure apparatus 100 back to a rolled or retracted configuration, the driver disconnects windshield connector portions 108a,b,c from windshield connections 75a,b,c, and the spring mechanism of roller 102 (as shown in FIG. 1) functions to wind shade portion 104 around the circumference of roller 102.

Figure 6:
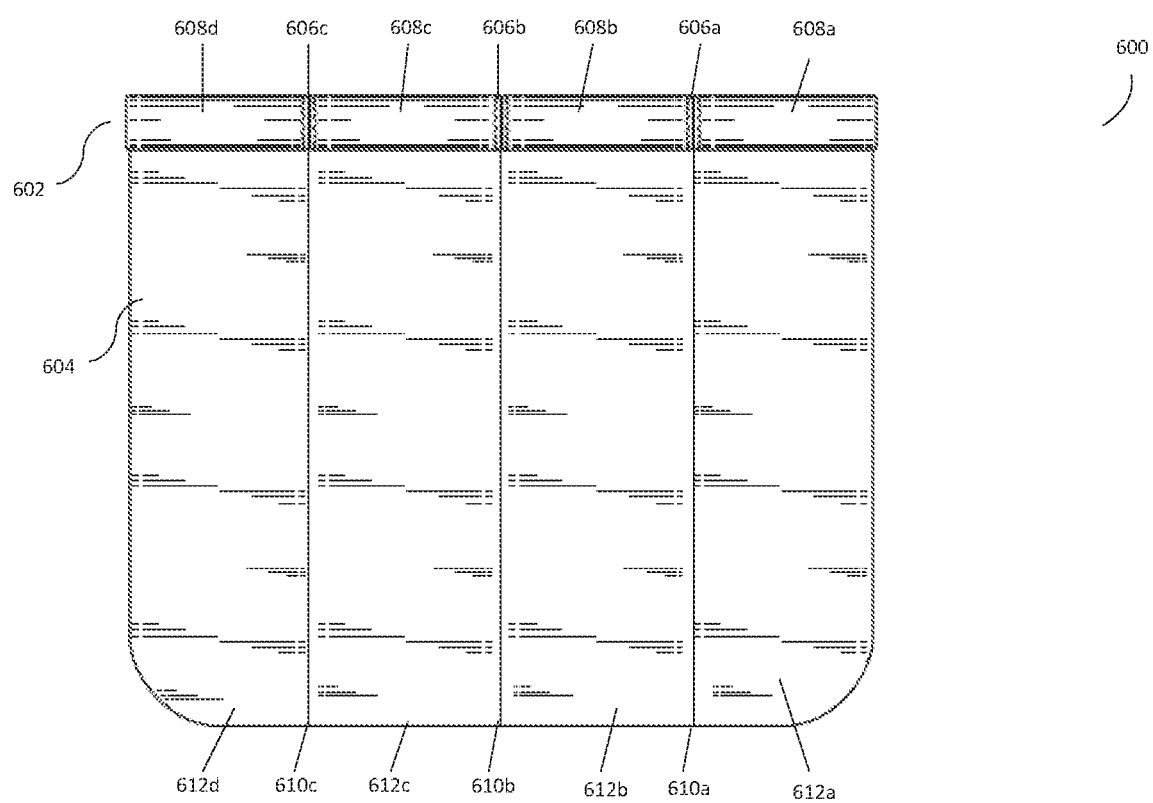
FIG. 6 is a perspective view of a vehicle interior protection apparatus, according to an alternative embodiment of the present disclosure.
Figure 7:
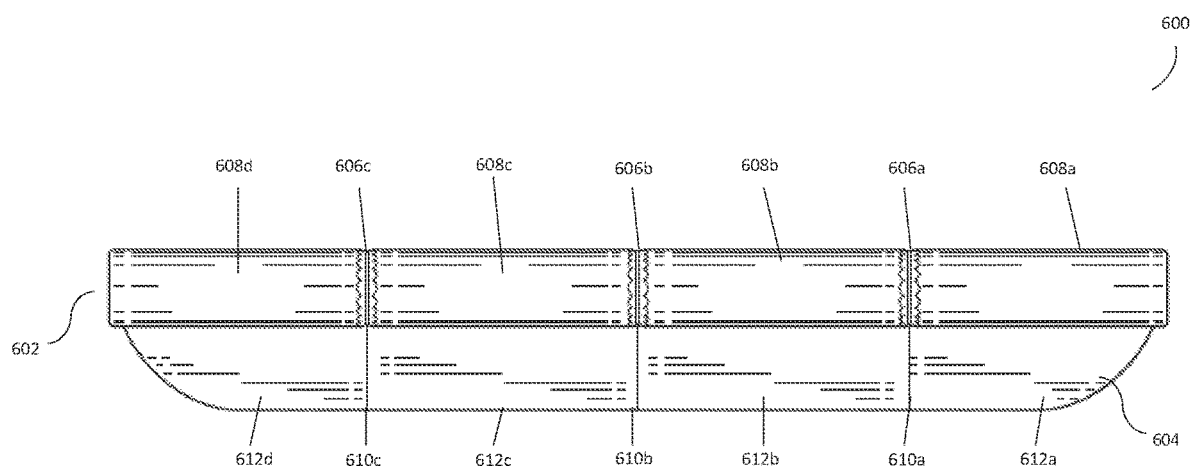
FIG. 7 is a perspective view of a vehicle interior protection apparatus in a folded configuration, according to the embodiment of FIG. 6; and, FIG. 8a and FIG. 8b are functional views of a vehicle interior protection apparatus in a vehicle, according to the embodiment of FIG. 6.

FIG. 6 is a perspective view of a vehicle interior protection apparatus 600, according to an alternative embodiment of the present disclosure. According to an embodiment, vehicle interior protection apparatus 600 may be comprised of a weighted portion 602 and a dashboard protection portion 604. Dashboard protection portion 604 may be constructed of a waterproof or water resistant fabric. Dashboard protection portion 604 may be comprised of sections 612a,b,c,d and pleats 610a,b,c. Sections 612a,b,c,d may be foldable at pleats 610a,b,c. Dashboard protection portion 604 may be comprised of as few as two sections 612 and one pleat 610. Weighted portion 602 may be coupled to a first end of dashboard protection portion 604. Weighted portion 602 may be comprised of weighted segments 608a,b,c,d. Weighted segments 608a,b,c,d may be constructed of the same water resistant material as dashboard protection portion 604, and may be sewn to enclose a weighted material in an inner portion of weighted segments 608a,b,c,d. Weighted segments 608a,b,c,d may be coupled together at midpoint portions 606a,b,c. Midpoint portions 606a,b,c may be substantially aligned with pleats 610a,b,c such that apparatus 600 may be folded and rolled, as shown in FIG. 7.

Figure 8A:
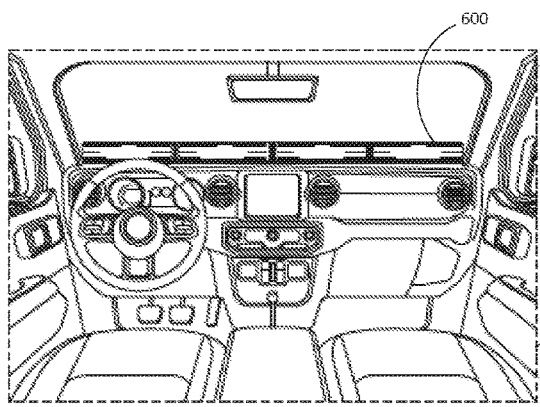
Figure 8B:
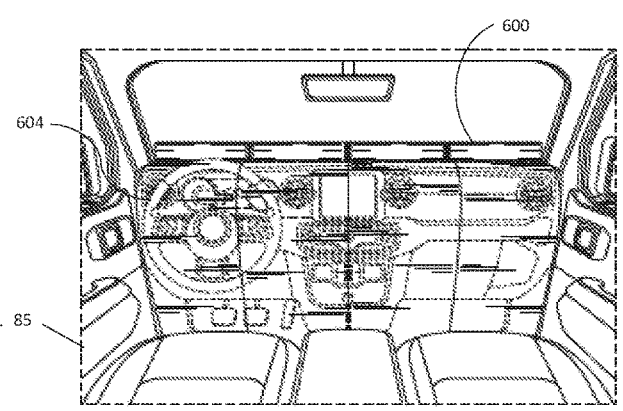

FIG. 8a and FIG. 8b are functional views of vehicle interior protection apparatus 600 being utilized in a vehicle interior 85, according to the embodiment of FIG. 6. According to an embodiment, apparatus 600 is placed on the dashboard of vehicle interior 85. Weighted segments 608a,b,c,d (as shown in FIG. 6) hold apparatus 600 in place on the dashboard of vehicle interior 85 when in use. When a user desires to cover the dashboard of vehicle interior 85, for example when the vehicle is in park and unoccupied, the user unfolds and unrolls apparatus 600 such that dashboard protection portion 604 extends to cover the dash portion of vehicle interior 85. When the user desires to drive the car, the user folds and rolls apparatus 600 into a folded position and removes apparatus 600 from the dashboard of vehicle interior 85. Apparatus 600 may be stowed under a vehicle seat or in a glove compartment when not in use.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. An automotive interior protection apparatus comprising:
   a roller portion being substantially cylindrical in shape and comprising a spring mechanism configured to rotate the roller portion from a first position to a second position;
   a shade portion being substantially rectangular in shape and coupled to the roller portion at a first end, the shade portion being selectively rolled around a circumference of the roller portion, the shade portion being made of a water resistant fabric;
   a bar portion coupled to a second end of the shade portion, the bar portion being substantially rigid;
   at least one windshield connector coupled to a surface of the bar portion; and,
   at least one roll bar connector selectively coupled to the roller portion, the at least one roll bar connector being configured to selectively secure the roller portion to a roll bar of an open-top automobile.

2. The automotive interior protection apparatus of claim 1 further comprising a handle coupled to the bar portion.

3. The automotive interior protection apparatus of claim 1 further comprising at least two windshield connectors.

4. The automotive interior protection apparatus of claim 1 further comprising at least three windshield connectors.

5. The automotive interior protection apparatus of claim 1 wherein the at least one roll bar connector comprises a hook-and-loop fastener.

6. The automotive interior protection apparatus of claim 1 further comprising a housing, the roller portion being coupled within an interior portion of the housing.

7. The automotive interior protection apparatus of claim 1 wherein the at least one windshield connector is configured to selectively attach to a portion of a windshield frame of an open-top automobile.

8. An automotive interior protection apparatus comprising:
   a roller portion being substantially cylindrical in shape and comprising a spring mechanism configured to rotate the roller portion from a first position to a second position;
   a shade portion being substantially rectangular in shape and coupled to the roller portion at a first end the shade portion being selectively rolled around a circumference of the roller portion, the shade portion being made of a water resistant fabric;
   a bar portion coupled to a second end of the shade portion, the bar portion being substantially rigid;
   at least one windshield connector coupled to a surface of the bar portion; and,
   a housing having an exterior portion and an interior portion, the roller portion being secured within the interior portion of the housing the shade portion extending from the interior portion of the housing at the first end of the shade portion to the exterior portion of the housing at the second end of the shade portion, the housing being configured to be selectively coupled to a roll bar of an open-top automobile.

9. The automotive interior protection apparatus of claim 8 further comprising a handle coupled to the bar portion.

10. The automotive interior protection apparatus of claim 8 further comprising at least two windshield connectors.

11. The automotive interior protection apparatus of claim 8 further comprising at least three windshield connectors.

12. The automotive interior protection apparatus of claim 8 wherein the at least one windshield connector is configured to selectively attach to a portion of a windshield frame of an open-top automobile.

13. The automotive interior protection apparatus of claim 8 wherein the housing is constructed from a plastic material.

14. An automotive interior protection apparatus comprising:
- a dashboard protection portion being constructed of a water resistant fabric, the dashboard protection portion having a first end and a second end and at least one pleat extending from the first end to the second end; and,
- a weighted portion coupled to the first end of the dashboard protection portion, the weighted portion being comprised of at least two segments, the at least two segments being configured to fold at a first midpoint, the first midpoint being aligned with the at least one pleat of the dashboard protection portion.

15. The automotive interior protection apparatus of claim 14 wherein the weighted portion further comprises at least three segments.

16. The automotive interior protection apparatus of claim 14 wherein the weighted portion further comprises at least four segments.

17. The automotive interior protection apparatus of claim 14 wherein the dashboard protection portion further comprises at least two pleats extending from the first end to the second end of the dashboard protection portion.

18. The automotive interior protection apparatus of claim 14 wherein the dashboard protection portion further comprises at least three pleats extending from the first end to the second end of the dashboard protection portion.

19. The automotive interior protection apparatus of claim 15 wherein the at least three segments are configured to fold at the first midpoint and a second midpoint.

20. The automotive interior protection apparatus of claim 16 wherein the at least four segments are configured to fold at the first midpoint a second midpoint, and a third midpoint.

* * * * *